United States Patent [19]
Bellaton et al.

[11] Patent Number: 6,026,093
[45] Date of Patent: Feb. 15, 2000

[54] MECHANISM FOR DISPATCHING DATA UNITS VIA A TELECOMMUNICATIONS NETWORK

[75] Inventors: Gilles Bellaton, St Martin D'Heres; Herve L Bancilhon, Poisat, both of France

[73] Assignee: Sun Microsystems, Inc., Palo Alto, Calif.

[21] Appl. No.: 08/942,855

[22] Filed: Oct. 2, 1997

[51] Int. Cl.⁷ .................................................. H04L 12/54
[52] U.S. Cl. ........................................... 370/412; 370/429
[58] Field of Search ................................. 370/413, 415, 370/428, 412, 395, 230, 418, 419, 429, 355, 465, 468, 471, 474

[56] References Cited

U.S. PATENT DOCUMENTS

| | | | |
|---|---|---|---|
| 5,293,379 | 3/1994 | Carr | 370/94.1 |
| 5,307,347 | 4/1994 | Duault et al. | 370/85.1 |
| 5,307,413 | 4/1994 | Denzer | 380/49 |
| 5,309,437 | 5/1994 | Perlman et al. | 370/85.13 |
| 5,351,237 | 9/1994 | Shinohara | 370/58.3 |
| 5,528,763 | 6/1996 | Serpanos . | |
| 5,535,199 | 7/1996 | Amri et al. | 370/60 |
| 5,729,530 | 3/1998 | Kawaguchi et al. . | |
| 5,764,641 | 6/1998 | Lin . | |

*Primary Examiner*—Douglas W. Olms
*Assistant Examiner*—Kenneth Vanderpuye
*Attorney, Agent, or Firm*—Sabath & Truong; Bobby K. Truong

[57] ABSTRACT

A dispatch mechanism is provided for dispatching data units, (e.g. datagrams or packets) divided into one or more fragments, via a telecommunications network. The dispatch mechanism includes a queue for queuing fragments for transmission. It further includes a queue controller operable when a fill level of the queue exceeds a threshold value to discard fragments of data units for which a fragment has not already been queued and to add to the queue fragments of data units for which a fragment has already been queued. The dispatch mechanism maintains a record of data units which are to be transmitted (that is when one fragment of the data unit has already been passed for despatch) and a record of data units which are to be dropped (that is data units for which a fragment has already been dropped). The dispatch mechanism enables more effective use of network capacity by reducing the possibility of incomplete data units being transmitted over the network. In other words, where one data unit fragment is dropped, a mechanism ensures that all remaining fragments of that data unit are dropped. Also, where one data unit fragment has been sent, the mechanism ensures that all other fragments for that data unit are sent, irrespective of the fill level of the output queue when a data fragment for transmission is processed.

18 Claims, 12 Drawing Sheets

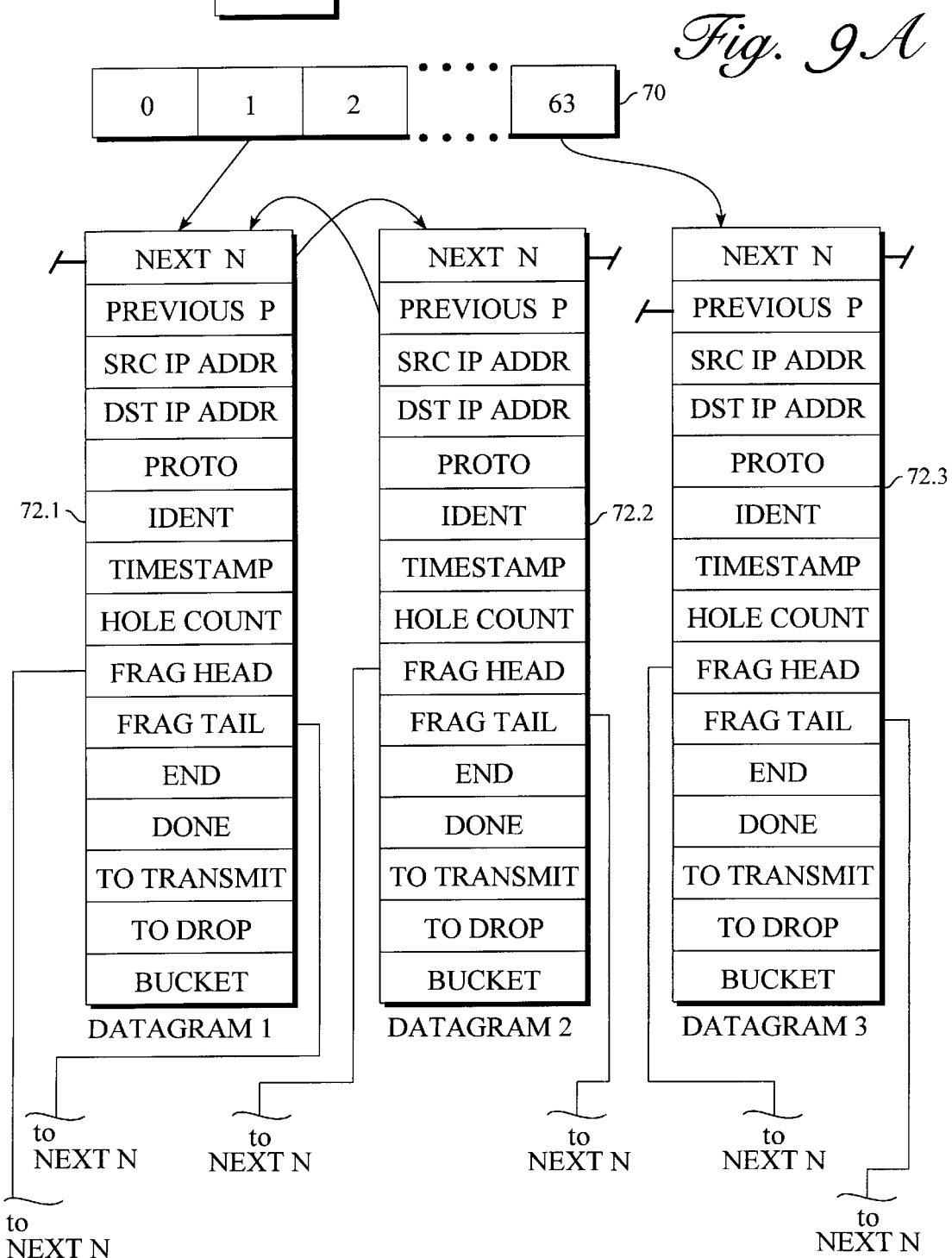

MECHANISM FOR DISPATCHING DATA UNITS VIA A TELECOMMUNICATIONS NETWORK

BACKGROUND OF THE INVENTION

This invention relates to a dispatch mechanism and to a router or sender station for dispatching data units comprising one or more fragments via a telecommunications network.

The invention finds particular application to transmission of data units via an inter- or intra-network operating under an Internet Protocol.

FIG. 1 is a schematic representation of an instance of an inter- or intra-net with a router 10 being provided in the path between a source 12 and a destination 14. Between the source 12 (or sender node) and the router node 10, a net 16 is shown and between the router node 10 and the destination node 14 a further net 18 is shown. In practice, the net 16 and the net 18 can be one and the same and the router 10 effectively forms a "staging post" between the source 12 and the destination 14. In the following, reference is made to a dispatch mechanism. It should be appreciated that the dispatch mechanism could, in the present context, equally form part of the source, or sender station 12 or the router station 10.

FIG. 2 is a schematic representation of the configuration of a station for a router 10 or source or destination 12, 14. These stations can be implemented using any appropriate technology. However, as illustrated in FIG. 2, the station 10 is implemented by a server computer 20 comprising a system unit 22, optionally with a display 38, keyboard 40 and other input devices 42. It should be noted that the router 10 need not include a keyboard, display, etc. FIG. 2A is a schematic block representation of aspects of the contents of the system unit 22. As illustrated in FIG. 2A, the system unit includes a processor 28, memory 30, disk drives 24 and 26, and a communications adaptor 32 for connection to one or more telecommunications lines 34 for connection to the telecommunications network 16/18. As illustrated in FIG. 2A, the components of the system unit are connected via a bus arrangement 36. It will be appreciated that FIGS. 2/2A are a general schematic representation of one possible configuration for a server computer for forming a router or sender or destination station, and that many alternative configurations could be provided.

Conceptually, the Internet provides three sets of services. At the lowest level, a connectionless delivery system provides a foundation on which everything rests. At the next level, a reliable transport service provides a high level platform. At the third level, application services are provided which rely on the reliable transport service.

A fundamental Internet service consists of an unreliable, best-effort, connectionless, packet delivery system. The service is described as being "unreliable" because delivery is not guaranteed. A packet may be lost, duplicated, or delivered out of order, but the Internet will not detect such conditions, nor will it inform the sender or receiver. The service is described as being "connectionless" because each packet is treated independently from all others. A sequence of packets sent from one machine to another may travel over different paths, or some may be lost while others are delivered. The service may be described as "best-effort" because the Internet aims to deliver packets.

The protocol that defines the unreliable, connectionless, delivery mechanism is called the "Internet Protocol", and is usually referred to by its initials IP. IP defines the formal specification of data formats, including a basic unit of data transfer and the exact format of all data passing across the Internet. IP also includes rules which specify how packets should be processed and how errors should be handled. In particular, IP embodies the idea of unreliable delivery and packet routing.

Further details of aspects of the Internet and TCP/IP protocols may be found, for example, in the following U.S. Pat. Nos.: 5,293,379; 5,307,347; 5,307,413; 5,309,437; 5,351,237; and 5,535,199.

The basic unit of data transfer over the Internet is termed an "Internet datagram", or alternative "IP datagram", or simply "datagram". A datagram comprises header and data areas, and source and destination addresses. There is no fixed size for a datagram. Bearing this in mind, and also the physical constraints of the underlying hardware services on which the Internet is based, it is necessary to divide the datagram into portions called "fragments".

FIG. 3 illustrates the format of an Internet datagram. The same format is used for a fragment of a datagram.

The 4 bit version field (VERS) specifies the IP protocol version and is used to ensure that all of the nodes along the path of the datagram agree on the format.

The LEN field gives the datagram header length measured in 32 bit words. The TOTAL LENGTH field gives the length of the IP datagram measured in octets including the length of the header and data.

The SERVICE TYPE field contains handling details for the datagram.

Three fields in the datagram header, IDENT, FLAGS, and FRAGMENT OFFSET, control fragmentation and reassembly of datagrams. The field IDENT contains a unique identifier that identifies the datagram.

In the FLAGS field, a first bit specifies whether the datagram may be fragmented, and a second bit indicates whether this is the last fragment in the datagram. The FRAGMENT OFFSET field specifies the offset of this fragment in the original datagram, measured in units of 8 octets, starting at offset zero.

As each fragment has the same basic header format as a complete datagram, the combination of the FLAGS and FRAGMENT OFFSET fields are used to indicate that the headers relate to fragments, and to indicate the position of the fragment within the original datagram. The FRAGMENT OFFSET field identifies the position within the datagram, and the second of the FLAGS bits mentioned above (which is sometimes called the MORE FRAGMENTS flag) is used to indicate whether there are any more fragments in the datagram, or conversely that the fragment concerned is the last fragment of the datagram.

The field PROTO is a form of type field. The HEADER CHECK SUM figure ensures integrity of header values.

SOURCE IP ADDRESS and DESTINATION IP ADDRESS contain 32 bit Internet addresses of the datagram's sender and intended recipient. The OPTIONS field and the PADDING field are optional in the datagram. The field labelled DATA represents the beginning of the data field.

FIG. 4 is a schematic representation of an output buffer, or queue 50 in which packets P1, P2, P3, etc., are stored for transmission at 58 to the network 18. The packets need to be queued before transmission in order to ensure that the network 18 may be accessed for transmission of the packet.

As shown in FIG. 4, the queue 50 has five equally sized queue locations. It should be noted that FIG. 4 is purely schematic for illustrative purposes only and in practice the output queue of, for example, a router 10 would typically have a much larger capacity, and would also not be limited to fixed sized packets. However, for the purposes of illustration, a new packet P4 is assumed to be ready to be inserted in the queue for transmission. In this case, there are still two free locations 56 and accordingly the new packet P4, 52, can be inserted in the queue at that position. In time, more locations within the queue win become free as individual packets are transmitted at 58.

However, FIG. 5 illustrates a situation where, for example due to traffic loading, it is not possible to output packets rapidly enough at 58 from the queue 50 so that the queue 50 becomes full. Accordingly, as illustrated in FIG. 5, when a new packet P6, 53, is ready to be inserted in the queue, there is no place for it. Although the Internet does not discard packets unnecessarily, in the situation as illustrated in FIG. 5, the typical approach to dealing with such an overload situation is to simply discard the packet 53. This is an illustration of why the Internet is described as an "unreliable" service, as no guarantee is given that a packet will arrive at its intended destination.

The present invention does not attempt to provide a complete solution to the loss of packets. However, the invention is intended to address a particular problem where the packets relate to fragments of a datagram.

FIG. 6 illustrates three datagrams D1, D2 and D3 which are to be transmitted from a router 10 via a given path. Datagram D1 comprises four fragments F1, F2, F3 and F4. Datagram D2 also comprises four fragments, F1, F2, F3 and F4. Datagram D3 comprises two data fragments F1 and F2.

FIG. 6A illustrates a situation where all of the fragments of datagram D1 have been queued in the queue 50 ready for transmission at 58. It will be noted (as is typically the case), that the fragments in the queue are not in the order intended for the datagram. Thus, fragment D1F1 is followed by fragment D1F2, then fragment D1F4 and finally fragment D1F3. By use of the TOTAL LENGTH, FRAGMENT OFFSET, and MORE FRAGMENTS fields of the fragment headers it is possible for the router 10 and/or for the final destination to determine whether the complete datagram has been sent and received, respectively.

FIG. 6A also shows that one fragment D2F1 of datagram D2 has already been queued in the queue 50. It also shows that two new fragments 60 and 62 need to be added to the queue in the queue 50. However, it is assumed that at the instant that it is intended to add the fragments 60 and 62, the queue 50 is full. In this case, it would traditionally be the case that fragment 60 would be discarded and similarly fragment 62 would be discarded as there is no room. The result of discarding fragment 62 is that the available band width has been used unnecessarily for transmission of fragment D2F1 of datagram D2 as the complete datagram will now not be sent. With regard to the datagram D3, if at a subsequent time when the queue is not full, the fragment D3F2 is available for placement in the queue 50, then the fragment D3F2 will be sent, which will also have the result of making inefficient use of the available bandwidth as the fragment F1 of datagram D3 was not sent.

Accordingly, an object of the present invention is to seek to mitigate the problems of the prior art approach to the transmission of data units (for example datagrams) comprising multiple fragments.

SUMMARY OF THE INVENTION

In accordance with an aspect of the invention, there is provided a dispatch mechanism for dispatching data units comprising one or more fragments via a telecommunications network, wherein the router comprises a dispatch record and a dispatch controller, the dispatch controller being arranged:

to record a data unit as to be transmitted when one fragment of the data unit is processed for dispatch; and to record a data unit as to be dropped when a predetermined dispatch capacity is exceeded and a fragment for a data unit which has not been recorded as to be transmitted is to be processed.

This mechanism enables control of fragment dispatch to ensure that all fragments are sent for a data unit for which a fragment has already been sent and/or to ensure that all fragments of a data unit are dropped for a data unit for which a fragment has already been dropped. These measures reduce the number of partial data unit transmissions and consequently increase the available bandwidth for the transmission of complete data units.

References to data units are intended to cover all types of units of data, which can be fragmented for data transmission. In the present document, references are made in particular to data units in the form of datagrams for an IP environment. However, this relates to but one possible field of application of an embodiment of the invention, and in other embodiments for other environments, the data units could, for example, be packets or other fragmentable data units.

Preferably, the dispatch controller is arranged to record a data unit as to be dropped when a predetermined dispatch capacity has been exceeded and a fragment for a data unit which has not be marked as to be transmitted is to be processed. The dispatch controller can also be arranged to process a fragment for dispatch when the fragment is for a data unit recorded as to be transmitted, whether or not the predetermined dispatch capacity has been exceeded.

In a preferred embodiment, a dispatch queue is provided for fragments for transmission, wherein the dispatch controller is responsive to the dispatch queue fill level to determine whether the predetermined dispatch capacity has been exceeded.

In one embodiment, each fragment comprises a header including information relating to a data unit identifier, an offset identifier, a length value and a flag for identifying whether the fragment is the last fragment of a data unit or not.

The dispatch controller can be arranged to be responsive to the fragment header of a fragment for processing for determining whether to dispatch or drop the fragment.

In accordance with another aspect of the invention, there is provided a dispatch mechanism for dispatching data units comprising one or more fragments via a telecommunications network, the dispatch mechanism comprising:

a queue for fragments for transmission; and a queue controller operable when a fill level of the queue exceeds a threshold value to discard fragments of data units for which a fragment has not already been queued and to add to the queue fragments of data units for which a fragment has already been queued.

This mechanism enables control of a fragment queue for transmission to ensure that all fragments are sent for a data unit for which a fragment has already been sent and/or to ensure that all fragments of a data unit are dropped for a data unit for which a fragment has already been dropped. These measures reduce the number of partial data unit transmissions and consequently increase the available bandwidth for the transmission of complete data units.

Preferably a record of data units is kept for which fragments have been queued, the queue controller adding to the record when a new fragment is queued. The queue controller can be made responsive to the record to determine whether a fragment of a data unit has been queued. The use of a separate record facilitates the investigation of the queued fragments without needing to modify the fragments for transmission. The queue controller can be arranged to delete a record for a data unit when all fragments of a data unit have been queued. Alternatively, the deletion could be arranged when all fragments for a data unit have been sent.

A fragment may comprise a header including information relating to a data unit identifier, an offset identifier, a length value and a flag for identifying whether the fragment is the last fragment of a data unit or not. The queue controller can then be made responsive to the header of a fragment for transmission for determining whether to queue the fragment or not.

The queue controller can also hold information from the header of queued fragments in the record. In this case the queue controller is preferably responsive to the held fragment header information to identify when all fragments of a data unit have been queued for determining whether a record for a data unit can be deleted.

The dispatch mechanism can be implemented as a software dispatch mechanism to be implemented on the computing hardware of a router.

In accordance with another aspect of the invention, there is provided a router for dispatching data units comprising one or more fragments via a telecommunications network, wherein the router comprises a dispatch record and a dispatch controller, the dispatch controller being arranged:

to record a data unit as to be transmitted when one fragment of the data unit is processed for dispatch; and to record a data unit as to be dropped when a predetermined dispatch capacity is exceeded and a fragment for a data unit which has not been recorded as to be transmitted is to be processed.

The dispatch controller can be arranged to record a data unit as to be dropped when a predetermined dispatch capacity has been exceeded and a fragment for a data unit which has not been marked as to be transmitted is to be processed.

The dispatch controller can be arranged to process a fragment for dispatch when the fragment is for a data unit recorded as to be transmitted, whether or not the predetermined dispatch capacity has been exceeded.

In accordance with a further aspect of the invention, there is provided a method of dispatching data units comprising one or more fragments from a telecommunications node to a telecommunications network, wherein the node has a predetermined dispatch capacity, the method comprising:

identifying a data unit as to be transmitted when one fragment of the data unit has been processed for dispatch; and dropping a fragment for a data unit when a predetermined dispatch capacity of the node is exceeded and a fragment for a data unit which has not been identified as to be transmitted is to be processed.

In accordance with a further aspect of the invention, there is provided a software mechanism on a storage medium for dispatching data units comprising one or more fragments via a telecommunications network, wherein the dispatch mechanism is configured to be operable to define a dispatch record and a dispatch controller, the dispatch controller being arranged:

to record a data unit as to be transmitted when one fragment of the data unit is processed for dispatch; and to record a data unit as to be dropped when a predetermined dispatch capacity is exceeded and a fragment for a data unit which has not been recorded as to be transmitted is to be processed.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 7:
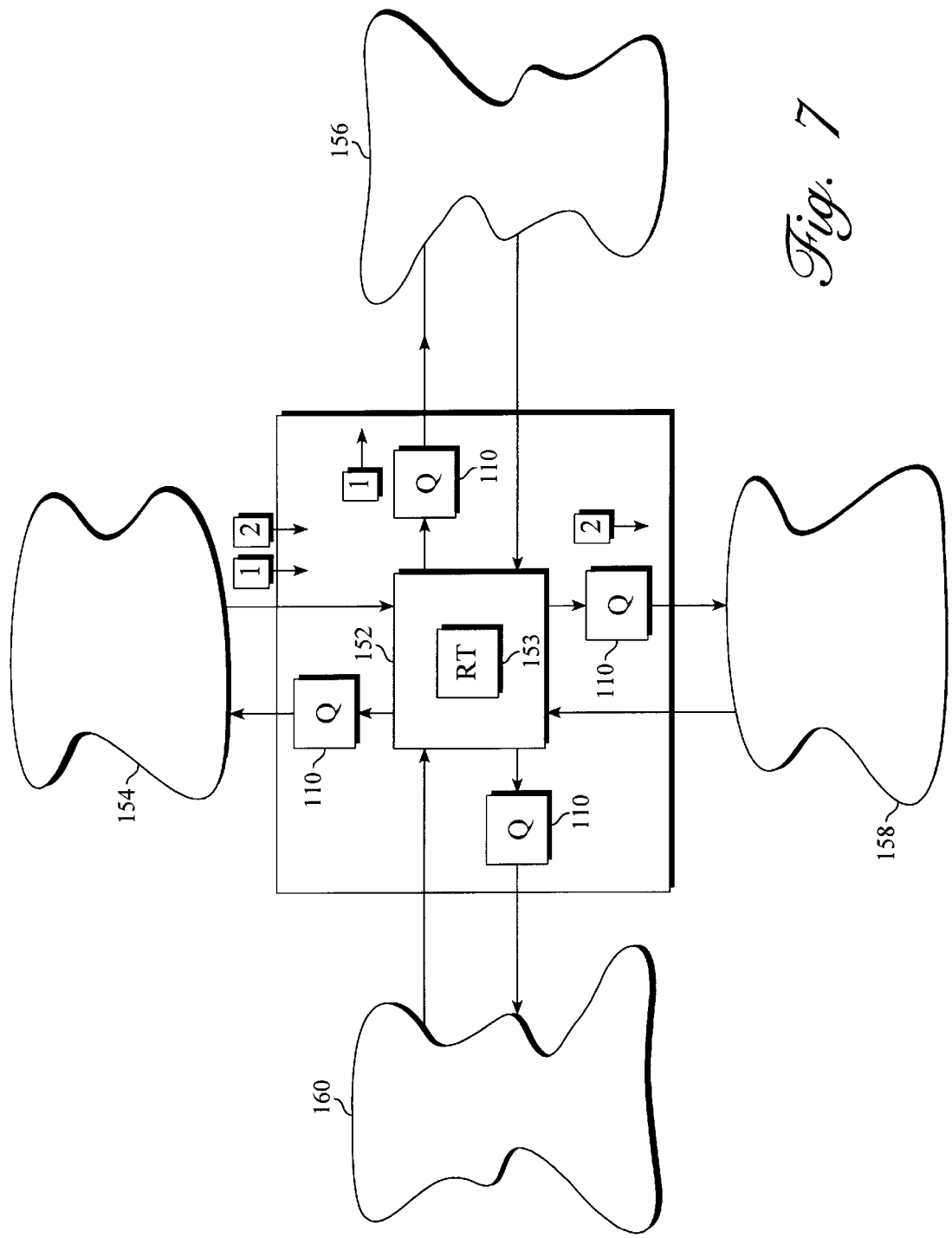
FIG. 7 is a schematic block diagram of a router.

FIG. 7 is a schematic representation of a router 150, having four bi-directional connections to a network or networks 154–160. The router can be implemented using conventional hardware, for example as described with respect to FIG. 2, with appropriate software implementing logic 152 for routing functions. Although represented separately, the networks 154–160 can effectively be part of the same network.

FIG. 7 illustrates schematically an example where two datagram fragments [1] and [2] are received from the network 154 and are routed to the network 156 and the network 158, respectively. The routing operations can be effected in a conventional manner by extracting destination information from received datagram fragments and by reference to routing tables 153, including mappings between destinations and routes, held in the router as part of the routing logic 152.

Also shown schematically in FIG. 7 is a dispatch mechanism 110 in each output path from the routing logic 152.

Figure 1:
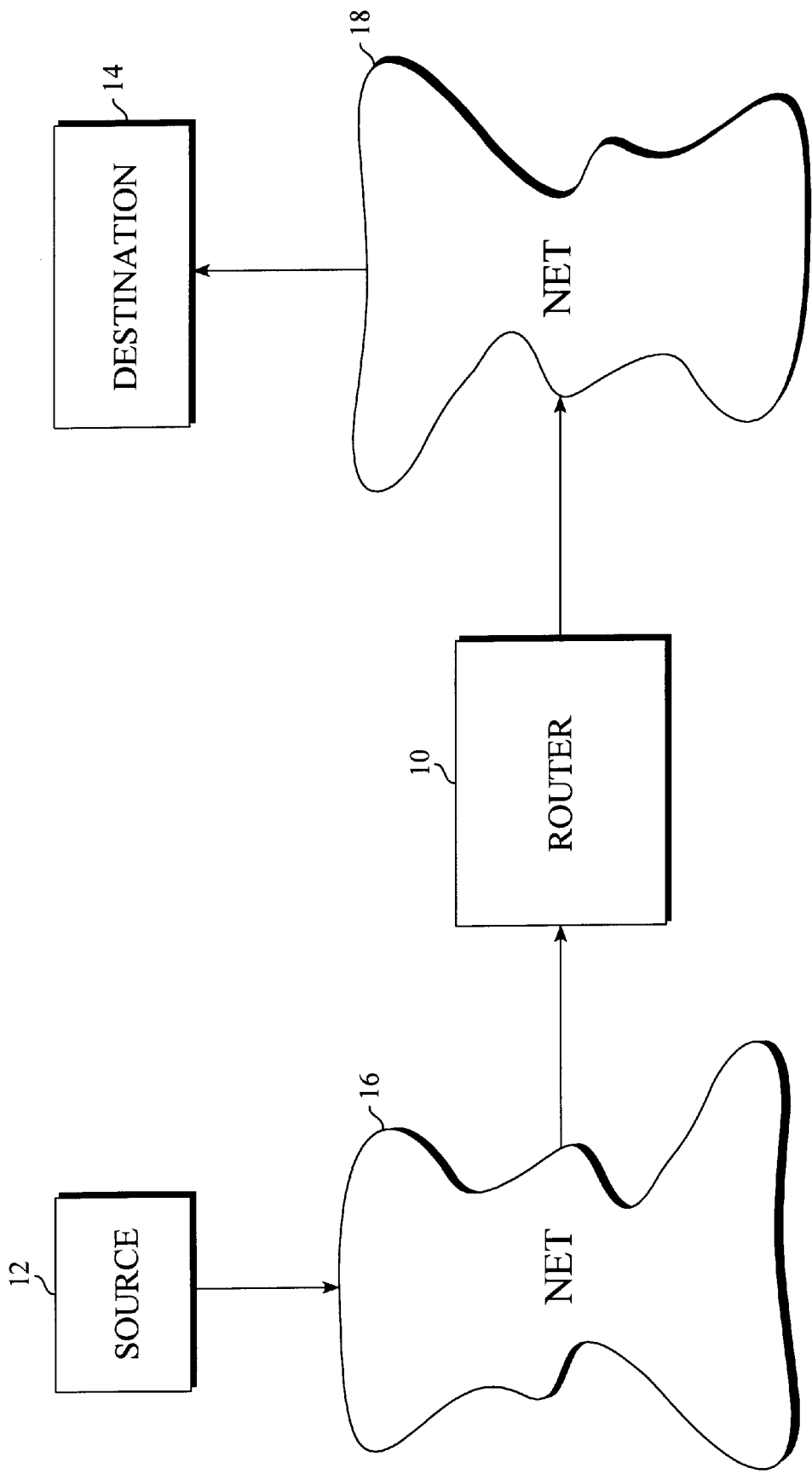
FIG. 1 is a schematic representation of a telecommunications environment including source and destination locations and a router interconnected via a network.
Figure 2A:
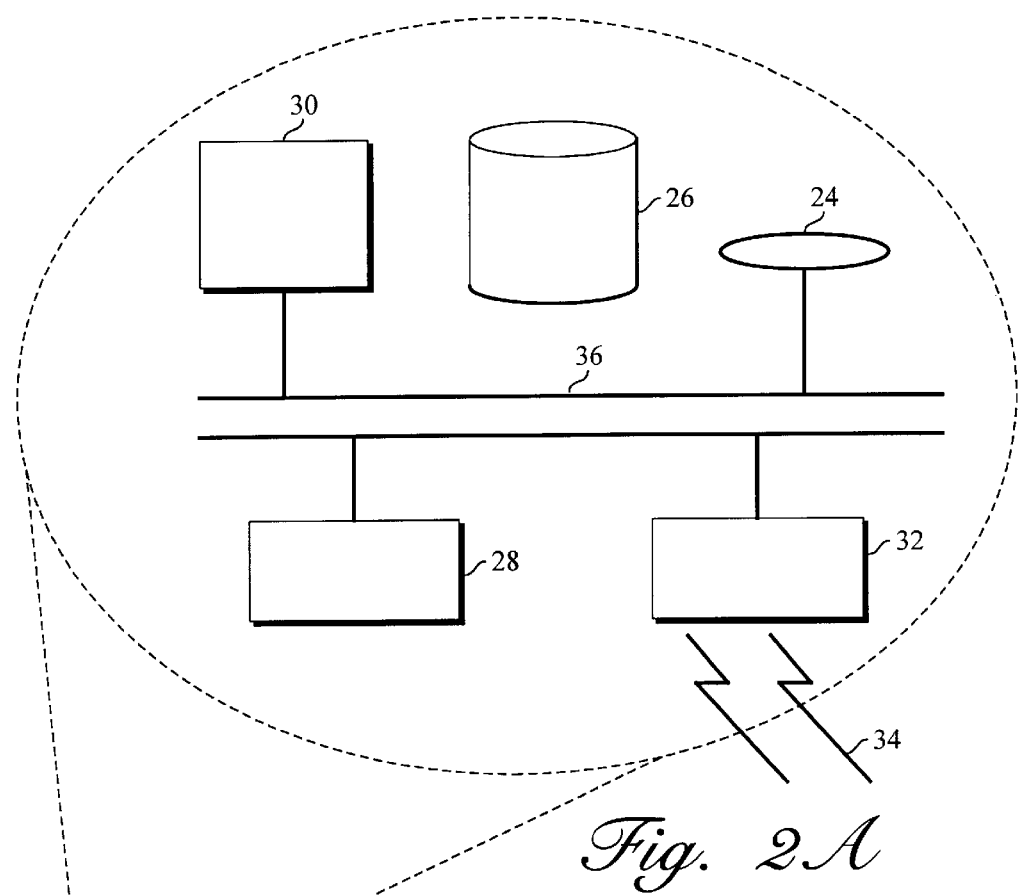
FIG. 2 is a schematic representation of one possible implementation of a router.
Figure 2:
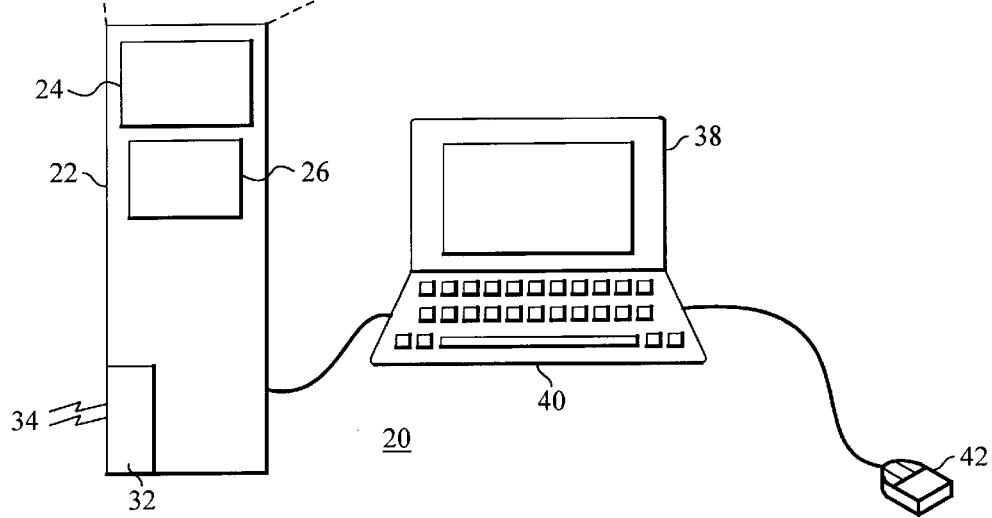
Figure 3:
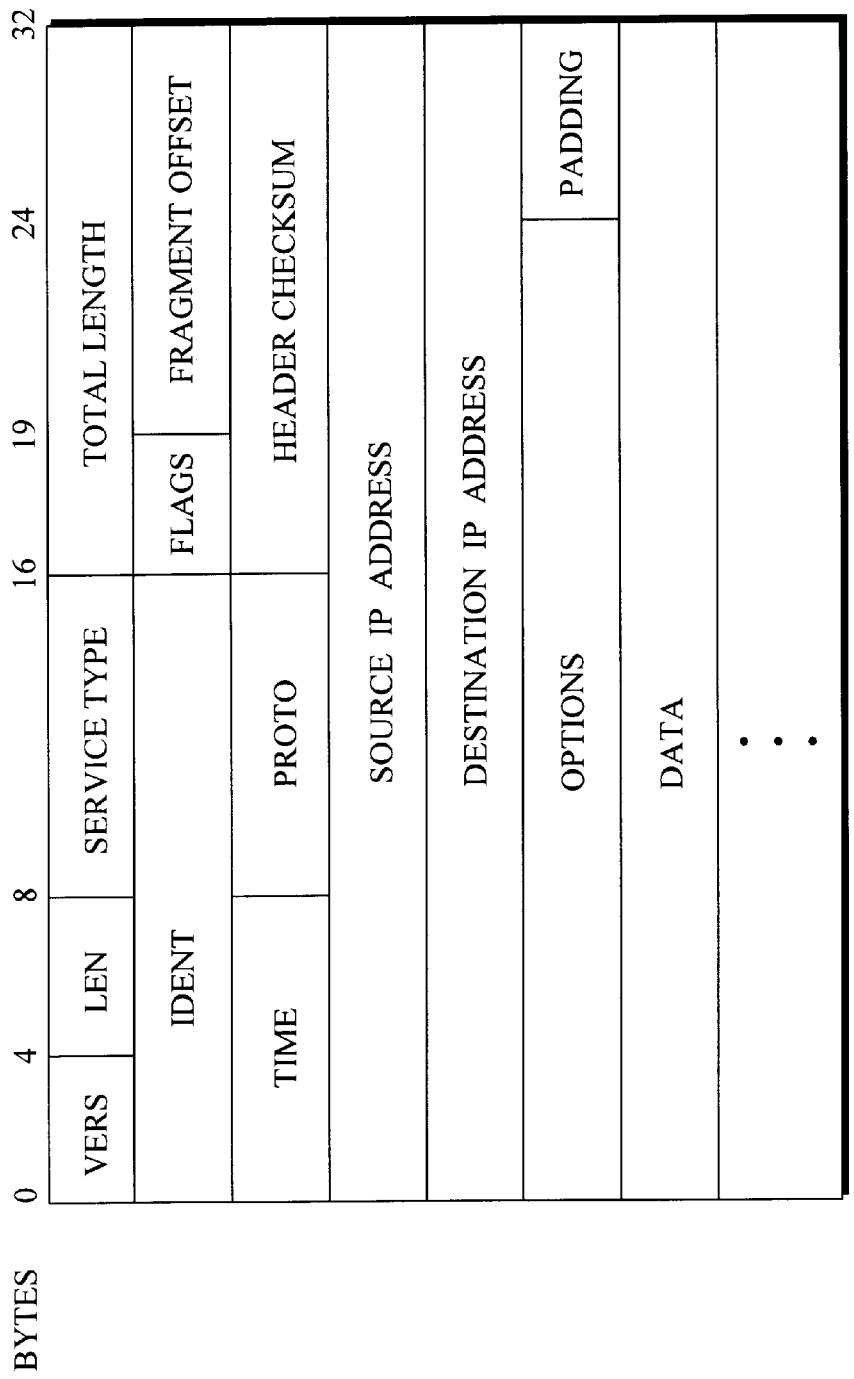
FIG. 3 is a schematic representation of a datagram format for use on the network.
Figure 4:
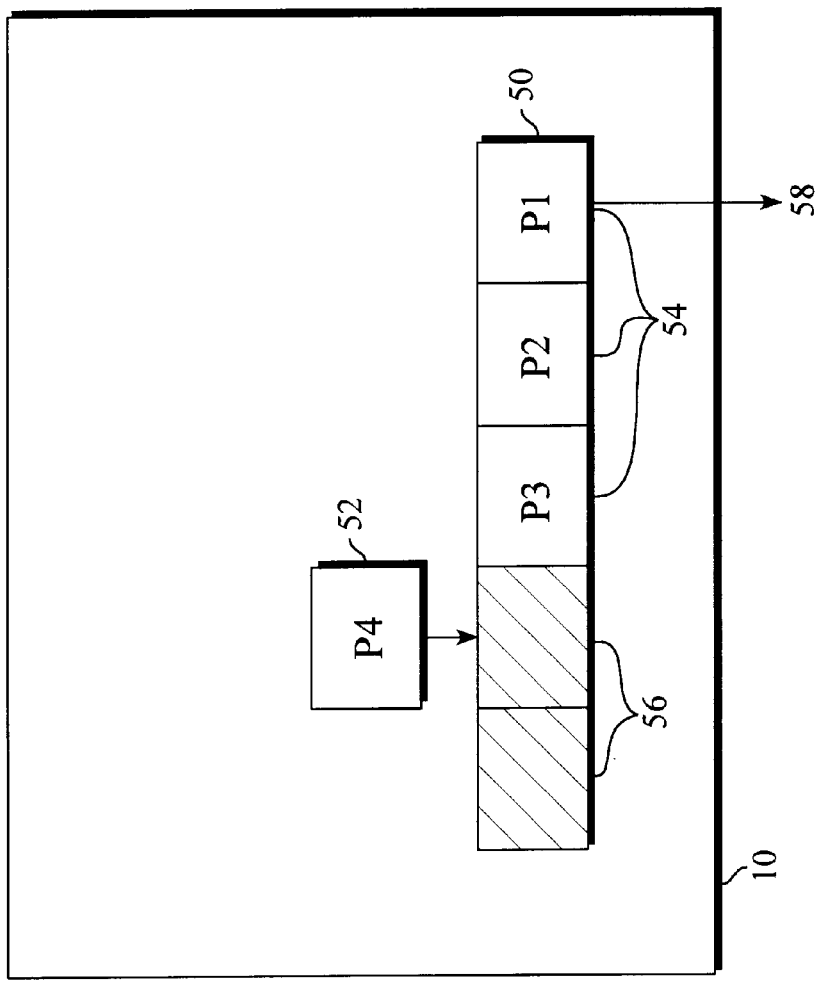
FIG. 4 illustrates the operation of an output queue in accordance with the prior art.
Figure 5:
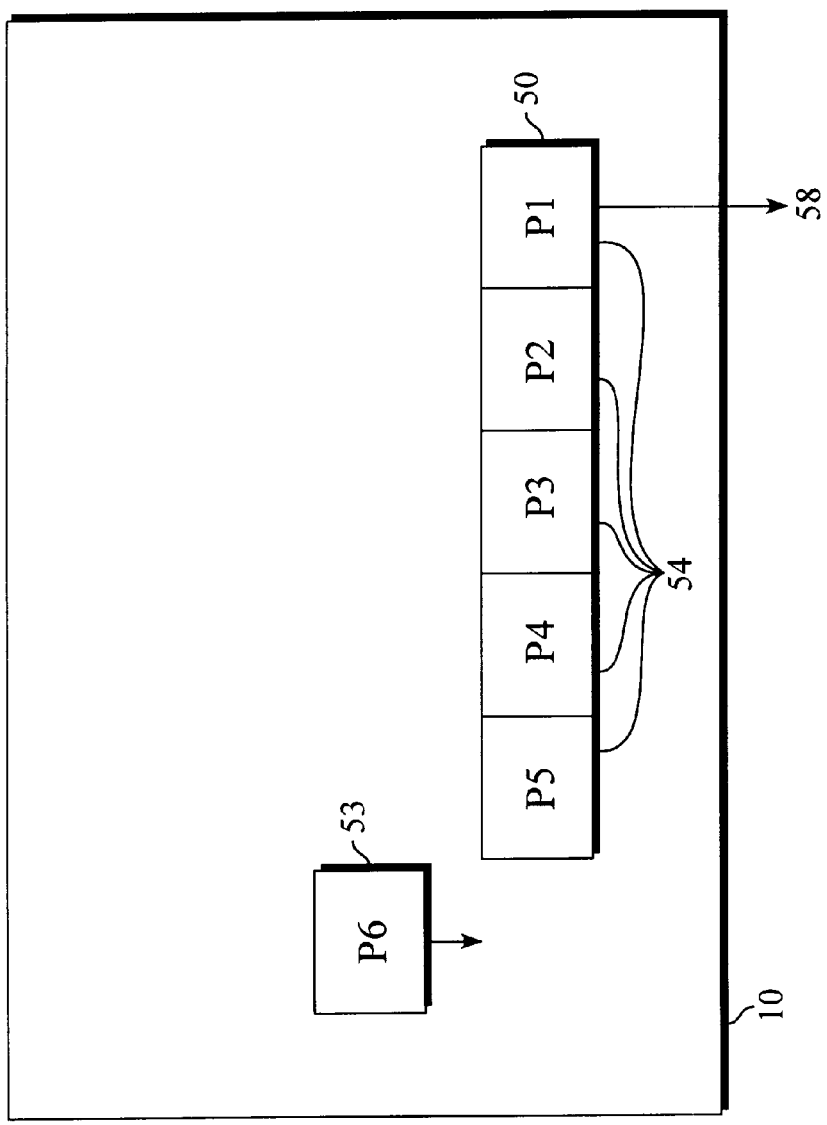
FIG. 5 illustrates the operation of an output queue in accordance with the prior art.
Figure 6:
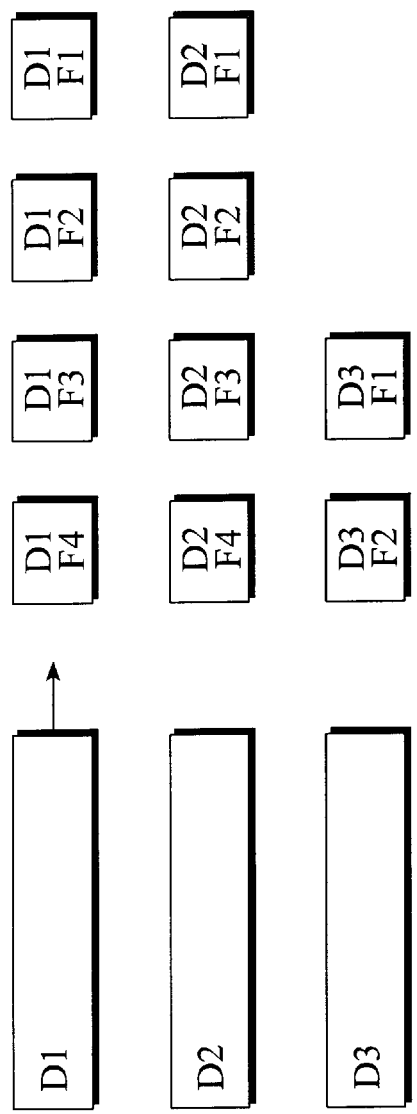
FIG. 6 illustrates the operation of an output queue as in FIGS. 4 and 5 for the output of a plurality of datagrams.
Figure 6A:
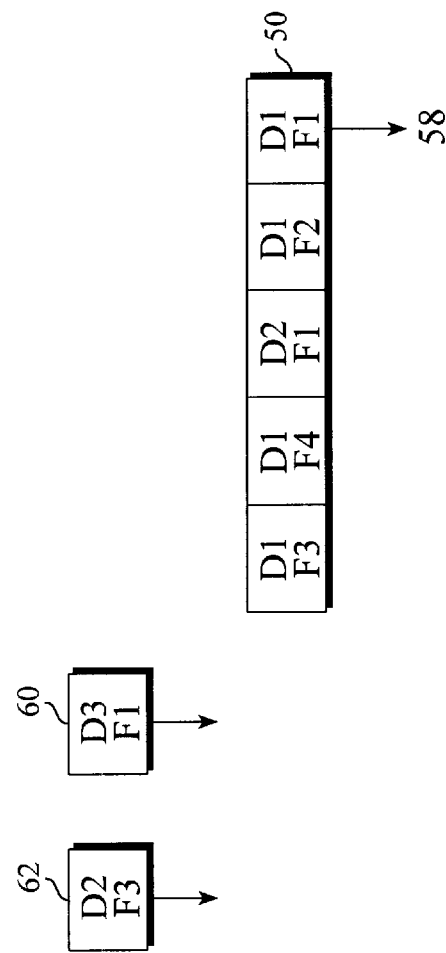
Figure 8:
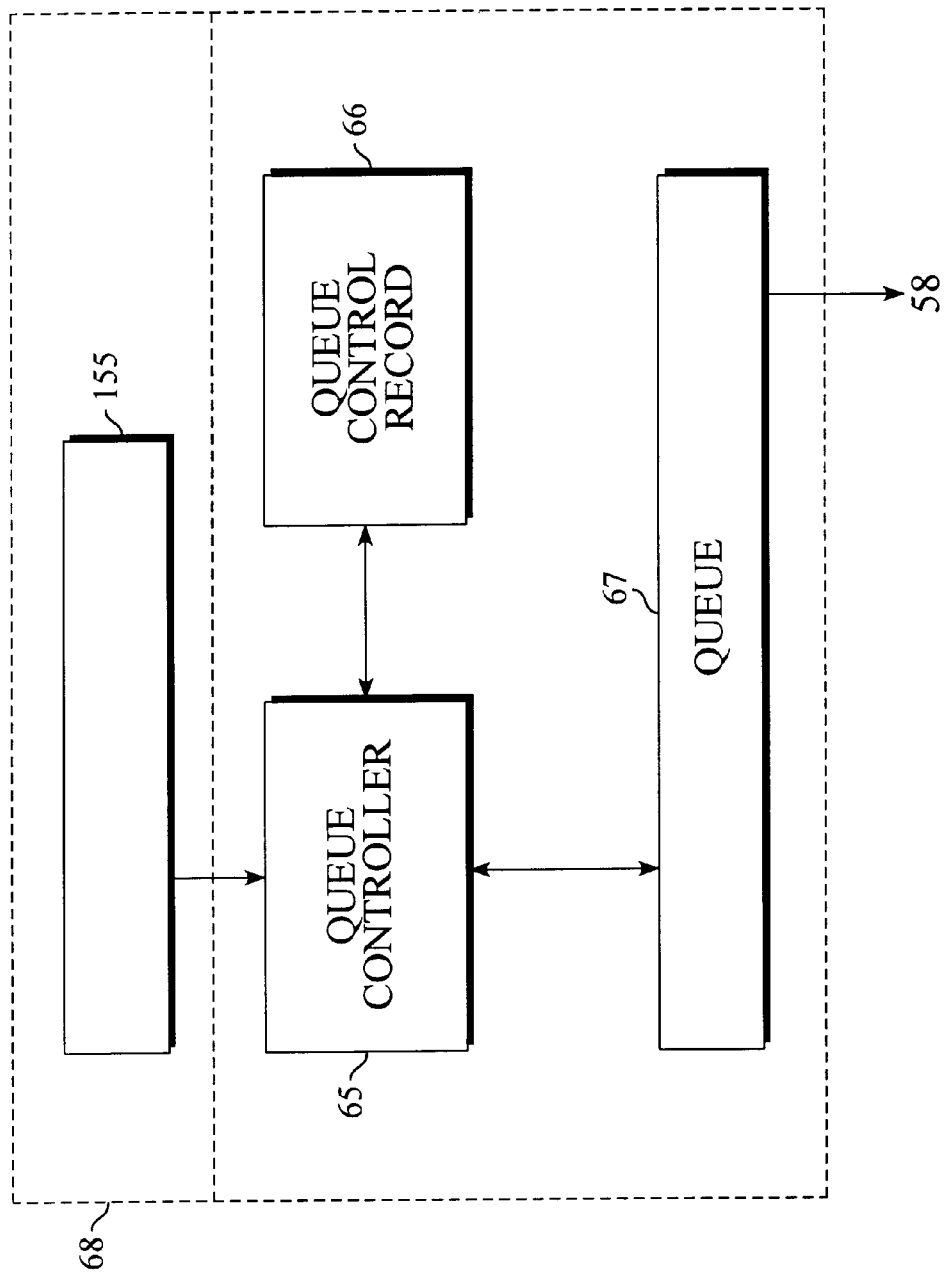
FIG. 8 is a schematic representation of an embodiment of a dispatch mechanism in accordance with the invention.

FIG. 8 is a schematic representation of an embodiment of a dispatch mechanism 68 in accordance with the invention, for incorporation in a node of the telecommunications network, for example in a router or sender (source station) as illustrated, for example, in FIG. 1. An embodiment of the present invention may be implemented within the same overall structure as illustrated in FIGS. 1–3. However, in accordance with the invention, the control of the buffer, or queue of packets to be transmitted to the network is controlled in a particular manner to take account of the fragments of a data unit (e.g. a datagram) to be transmitted.

The dispatch mechanism 68 can be connected, for example, to receive data units for dispatch from conventional routing logic of a router or sender station, as represented schematically by block 155 and provides a queuing mechanism, or structure, as further described in the following.

As represented schematically in FIG. 8, a queue controller 65 forming part of a dispatch mechanism 68 manages a queue 67 for datagram fragments to be transmitted at 58 to the network. The datagram fragments could, for example, have the structure shown in FIG. 3 where they are IP datagram fragments. The queue 67 could alternatively be described as an output buffer as it provides a buffer for datagram fragments to be output to the network. Once a datagram fragment has been added to the queue (output buffer) 67, it will be transmitted. The queue controller comprises or makes use of a queue control record 66 for the management of the queue 67. It should be noted that FIG. 8 is a schematic representation of one embodiment of the invention, and that other embodiments of the invention may comprise a different structure. It will be appreciated that the structure illustrated in FIG. 8 can be implemented by means of specific hardware, or alternatively by means of software operating on the computing system used to implement the dispatch mechanism. The dispatch system may be implemented in a router forming a "staging post" in the network or alternatively could be part of the source of datagrams (i.e. the sender station) to be transmitted to the network.

Figure 9B:
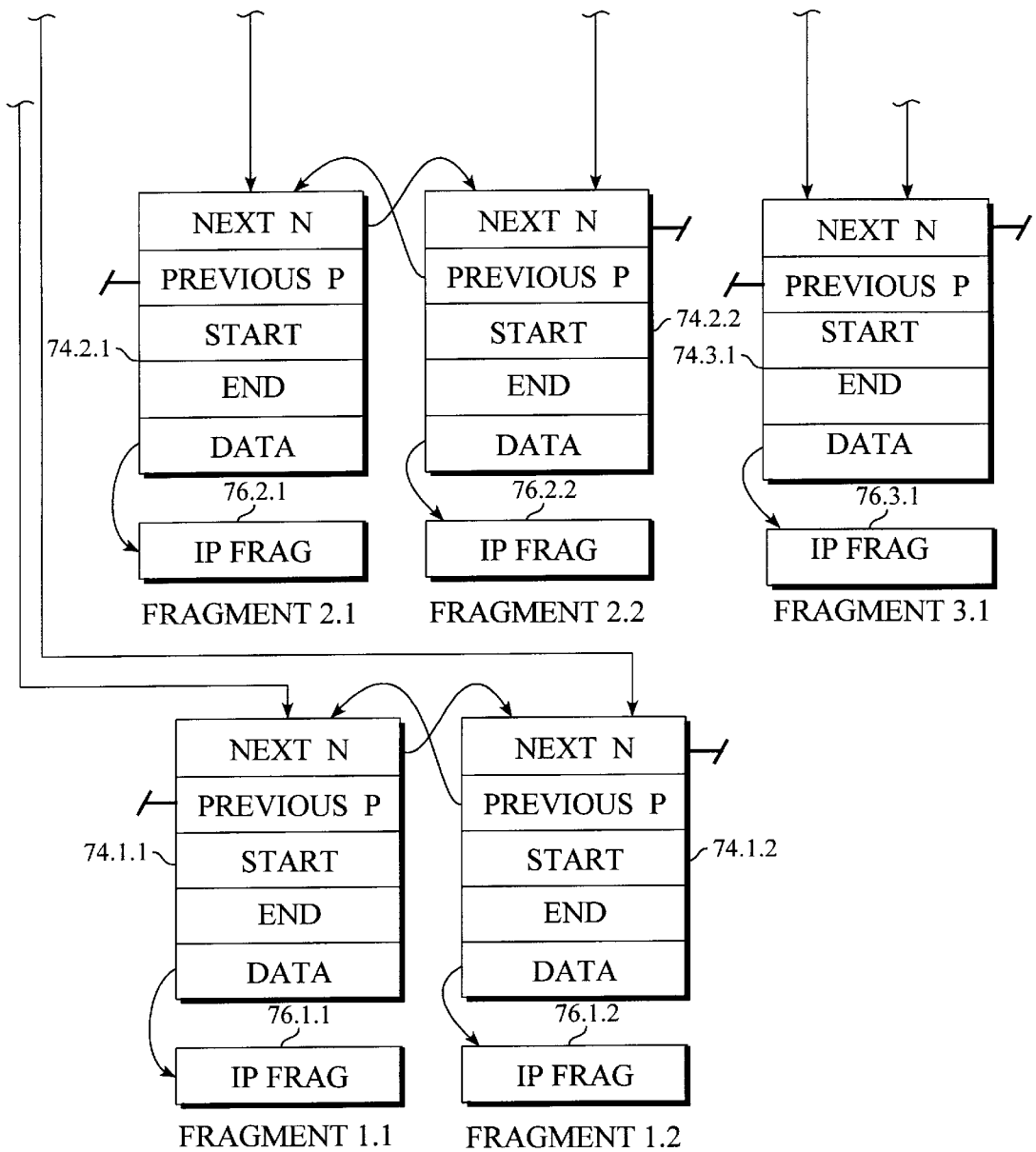
FIG. 9 is a schematic representation of a queue control data structure for a queue control record.

FIG. 9 is a representation of a linked-list data structure used for a particular implementation of the dispatch mechanism 68. The data structure can be held, for example, in random access memory of computer hardware in which the dispatch mechanism is implemented. The data structure comprises a hashing table 70 including pointers to datagram entries 72, which in turn include pointers to fragment entries 74, which in turn include pointers to actual fragments 76. As illustrated in FIG. 9, first and second datagram entries 72.1 and 72.2 are accessed via hash entry 1 and are linked to each other as a linked list by means of next pointers N and previous pointers P. The datagram represented by datagram entry 72.1 comprises two fragments represented by fragment entries 74.1.1 and 74.1.2. The fragment entries 74.1.1 and 74.1.2 are linked together as a linked list by means of next N and previous P pointers in the same manner as the linked list of datagram entries. The datagram entries 72.1 comprises a pointer H to the head of the linked list of fragments 74.1.1–74.1.2 and a pointer T to the tail of that list. Each of the fragment entries 74.1.1–74.1.2 contain a pointer to the respective fragment 76.1.1–76.1.2, respectively.

A linked list of fragments 74.2.1–74.2.2 is also pointed to by head and tail pointers in datagram entry 72.2. Each of the fragment entries 74.2.1–74.2.2 also includes a pointer to the respective fragments 76.2.1–76.2.2.

A datagram 72.3 is accessed via hash entry 63 and includes the same basic structure as the datagram entries 72.1 and 72.2. In the case of the datagram 72.3, there is only one fragment which is pointed to by both the Head and Tail pointers. The fragment entry 74.3.1 contains a pointer to the associated fragments 76.3.1.

The individual fields provided in a datagram entry 72 are set out below:

| | |
|---|---|
| NEXT | pointer to the next element in the list |
| PREVIOUS | pointer to the previous element in the list |
| SRC IP ADDR | datagram source address |
| DST IP ADDR | datagram destination address |
| PROTO | protocol which sent this datagram |
| IDENT | datagram identification (found in the IP header) |
| TIMESTAMP | entry creation time |
| HOLE COUNT | number of holes in the fragment list - is used when receiving the fragments out of sequence |
| FRAG HEAD | pointer to the head of the fragments list |
| FRAG TAIL | pointer to the tail of the fragments list |
| END | highest ending offset in the fragments list |
| DONE | set to 1 when all the fragments have been received |
| TO TRANSMIT | set to 1 if at least one fragment has been sent to the output queue |
| TO DROP | set to 1 is at least one fragment has been dropped |
| BUCKET | back pointer to the entry in the hash table |

| | |
|---|---|
| NEXT | pointer to the next entry in the fragments list |
| PREVIOUS | pointer to the previous entry in the fragments list |
| START | fragment starting offset |
| END | fragment ending offset |
| DATA | pointer to the fragment |

The queue 67 could be implemented by actually storing the fragments to be transmitted in a physical buffer. Alternatively, the buffer could be implemented by means of a further link-list structure as shown schematically in FIG. 10. Pointers 110 point to the head H and the tail T of a linked list of fragment entries 112 for each fragment in the output buffer 67. Each fragment entry can include a pointer to the next N and previous P fragment entries for fragments in the output buffer and a field DATA pointing to the fragment itself. In this case, the link-list structure and the fragment itself can be held in random access memory, for example the memory of a station in which the despatch mechanism is implemented (compare for example the system illustrated in FIG. 2).

Figure 10:
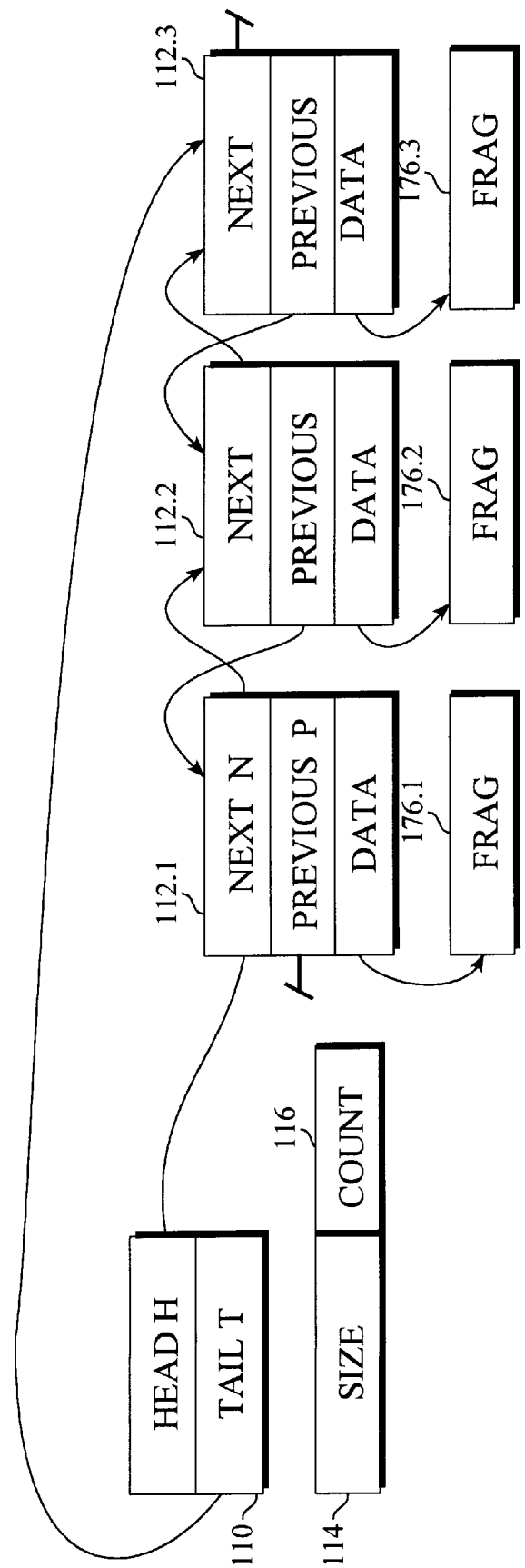
FIG. 10 is a schematic representation of a queue data structure.

When a fragment is transmitted from the queue (ie, is removed therefrom) the fragment entry concerned can be deleted from the list and the pointer for the adjacent fragment entry adjusted as well as the head H pointer of the pointers 110. Similarly, when a fragment is added to the output buffer, the tail pointer T of the pointers 110 can be amended to point to the new fragment entry 112 added to the queue, with the previous pointer P of the new fragment entry 112 being set to point to the previous tail fragment and the next pointer of the previous tail fragment entry being amended to point to the new fragment entry. The queue controller can be arranged to manage the link-list structure for the queue described with reference to FIG. 10 in combination with the control of the queue control record 66. Also shown in FIG. 10 are size and count registers 114 and 116. The size register can indicate a desired buffer fill factor representative of a given number of fragment entries in the output list and/or a given volume of information in the queue representative of a queue fill factor threshold, and a count register 116 can be used to keep track of a current count of the number of fragments and/or the volume of data currently held in the output buffer.

Figure 11:
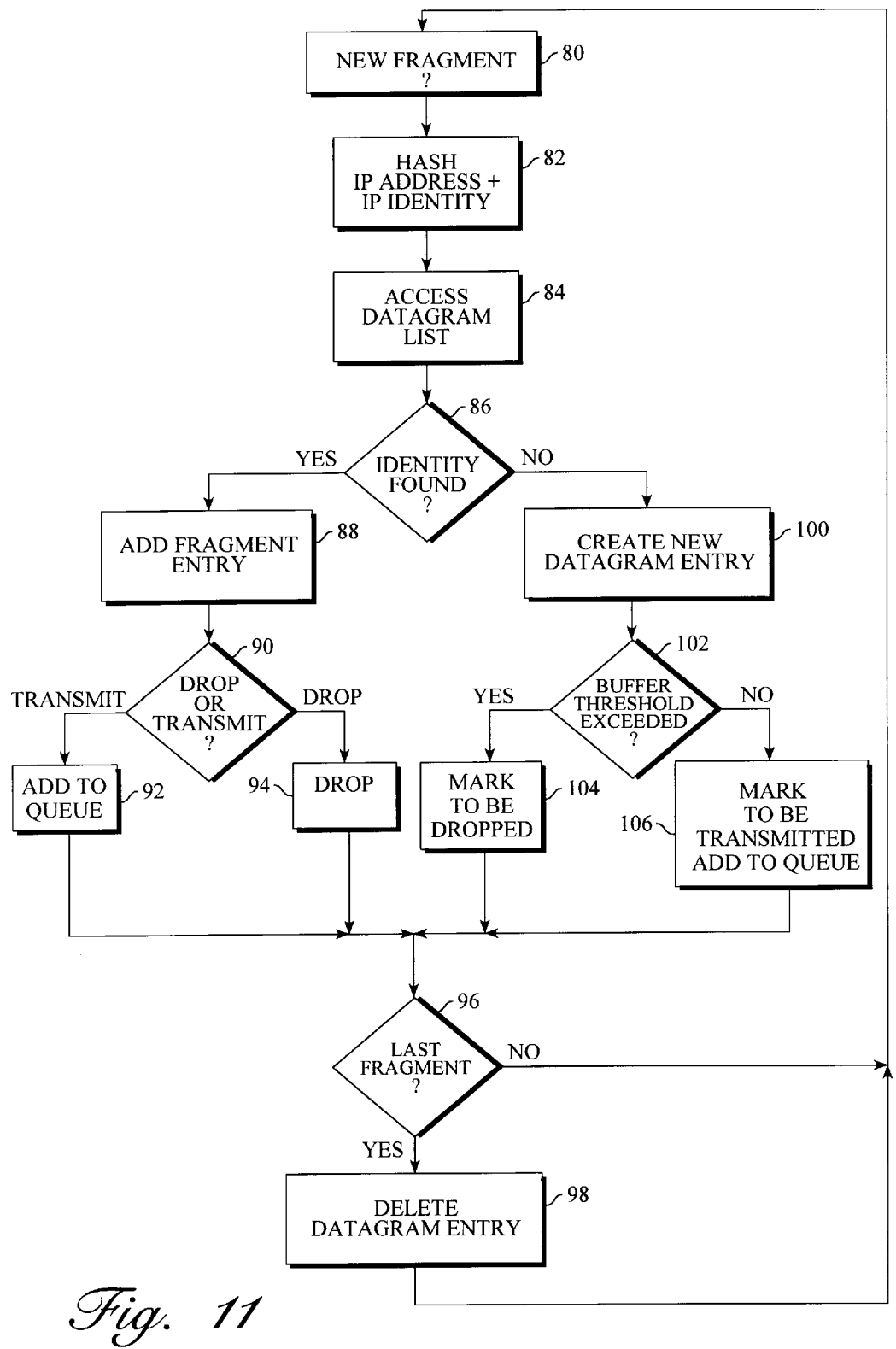
FIG. 11 is a flow diagram illustrating an example of the operation of a dispatch mechanism in accordance with the inventions.

The operation of the dispatch mechanism will now be described with reference to the flow diagram in FIG. 11.

At 80, the queue controller waits for a new fragment to be received. When a new fragment is received, the queue controller performs a hashing operation at 82 on the source IP address and the IP identity (IDENT) of the fragment to be sent. This returns an entry in the hash table 70 of FIG. 8.

The calculated hash entry points to a particular one of the linked list of datagrams. For example, if hash entry one is derived, the pointer points to the linked list comprising datagram entries 72.1 and 72.2. On accessing the datagram list at 84, the list is traversed until a datagram entry match with the datagram of the fragment to be sent is made. If the source address, destination address, protocol and identification are found at 86 to be the same, (ie. if the fields SOURCE ADDRESS, DESTINATION ADDRESS, PROTOCOL and IDENTIFICATION are the same), then a match has been found in the entry in the list.

Accordingly, if at 86 a match is found, the new fragment needs to be inserted in the fragment entries associated with the datagram entry concerned. The list of fragments associated with the datagram are sorted by ascending order of starting offset. Accordingly, the new fragment is inserted at the appropriate place in the list by adjustment of the next N and previous P pointers of the adjacent entries in the fragment list.

At step 90, a decision is then made whether the fragment is to be transmitted or is to be dropped.

If the datagram entry 72 is identified as to be dropped by setting of the "to drop" field, the fragment is dropped. If the datagram is identified as to be transmitted by means of the "to transmit" field being set, the fragment is added to the output queue (e.g., as described with reference to FIG. 10) regardless of the queue maximum length.

The use of the linked-list structure means that although a queue fill level threshold is set, this is not an absolute threshold value, but merely relates to a limit at which new datagrams for which a fragment has not yet been processed will be dropped as will be explained later.

If the fragment is marked "to transmit", the fragment is added to the output queue at 92. Alternatively, the fragment is effectively dropped at 94 by not being added to the output queue 67.

At 96, a test is made whether the fragment just received was the last fragment in the datagram. This can be achieved by comparing the start and end offsets of the fragments to determine whether the complete fragment has been queued for transmission. If so, the datagram entry is deleted at 98, along with the associated fragment entries. The fragments themselves remain in the output queue for transmission until they are actually transmitted.

If, at 86, no equivalent datagram is found, a new datagram entry is created at 100. As well as creating the datagram entry, a fragment entry is also created. The datagram entry 72.3 with the fragment entry 74.3.1 could represent such a newly created datagram entry. In such a case, the head H and tail T pointers will point to the same fragment entry 74.3.1. At 102, the fill level of the output queue is checked for example by comparison of the content of the size and count registers 114 and 116 illustrated in FIG. 10. If the output queue fill level exceeds a predetermined threshold (which could be expressed in absolute terms (for example numbers of octets) or in a percentage terms (for example a percentage of some maximum available storage space), this is indicative of the dispatch capacity of the dispatch mechanism being exceeded and the datagram entry will be identified, or recorded as "to be dropped" by setting the "to drop" field at step 104. In this case, the datagram fragment concerned will not be entered in the output queue. If, alteratively, the output queue is not full (that is the fill level of the output queue does not exceed the aforementioned threshold), the fragment is added to the output queue (i.e., is processed for dispatch) at step 106 (e.g., as described with reference to FIG. 10) and the datagram is identified or recorded as being "to transmit" by setting the "to transmit" field. As the datagram may only contain one fragment, the test is then made at step 96 as to whether this is the last fragment of the datagram. Thus the dispatch controller is responsive to the held fragment header information to determine if the datagram entry and associated fragment entries can be deleted from the queue record. Were this to be the case, the datagram entry would then be deleted at 98 (e.g., as described with reference to FIG. 10). Otherwise, control returns to step 80 to await the next fragment.

In the above description, it is assumed that fragments to be transmitted are sent to the output queue as soon as they are received, assuming the output queue is not full (in the case of a first received fragment for a datagram) or where the datagram is marked as "to be transmitted".

In an alternative embodiment, fragments are only forwarded directly to the output queue where the fragments arrive in order. This can be determined by the linked list of fragment entries 74. If fragments are not received in sequence, they are separately held in the data structure until the complete datagram is received. Then the fragments are sent in sequence to the output queue. In this case, the sequence of steps corresponding to steps 102, 104 and 106 are employed. In other words, if the output queue is full (i.e. the fill level threshold is exceeded) the fragment is dropped and the datagram is marked as "to be dropped". Alternatively, if the output queue is not full (i.e. the fill level threshold is not exceeded) the fragment is added to the output queue and the datagram is marked as "to transmit".

It will be noted that the datagram entry contains a time stamp field. The time stamp field is arranged to contain the creation time of the entry. If the entry still exists after a predetermined time (for example one minute) following creation, it is assumed that some fragments were not received in this interval and accordingly that fragments were lost. Accordingly, the datagram entry is deleted along with the fragments if they exist.

Accordingly, there has been described a dispatch mechanism for use in a router or a sender of messages for transmission over a network. The mechanism enables efficient use to be made of the bandwidth of the network, and avoids the unnecessary transmission of fragments of a complete datagram, where fragments have already been lost in respect of that datagram.

In the above description it is assumed that an output queue is provided, and that the determination of whether an output capacity has been exceeded relates to a fill level of the queue. In other embodiments of the invention there might not be a queue, and the dispatch capacity might relate simply to a flow rate of data being transmitted from the dispatch mechanism.

Although the invention has been described in particular in the context of data transmission in accordance with an Internet protocol, it will be appreciated that the invention is not limited thereto. Accordingly, the use of Internet-familiar terms such as "datagram" and "fragment" does not mean that the invention is limited to use with the Internet. It is to be noted that the terminology used in this application should be interpreted to encompass alternative structures. Thus, for example, where reference is made to a "datagram" other substantially equivalent terms such as "message", "frame", "packet", "block" etc. could be used, as appropriate, depending on the particular environment. Similarly, where reference is made to a "fragment" reference could instead be made, as appropriate, to a "segment", "block", etc. depending on the particular environment.

Accordingly, it will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A method for dispatching information sets, comprising:

receiving a fragment of a set of information, said set of information comprising a plurality of fragments;

determining whether a transmission queue has exceeded a predetermined threshold;

in response to a determination that said transmission queue has not exceeded said threshold, adding said fragment to said transmission queue; and ensuring that all other fragments of said set of information are added to said transmission queue when they are received regardless of the size of said transmission queue at the time that said other fragments are received, thereby guaranteeing that all fragments of said set of information are added to said transmission queue.

2. The method of claim 1, wherein ensuring comprises:

creating a record associated with said set of information; and storing in said record an indication that all fragments of said set of information are to be added to said transmission queue.

3. The method of claim 2, wherein ensuring further comprises:

receiving at least one of said other fragments;

determining whether said record contains an indication that all fragments of said set of information are to be added to said transmission queue; and in response to a determination that said record contains an indication that all fragments of said set of information are to be added to said transmission queue, adding said at least one other fragment to said transmission queue regardless of the size of said transmission queue at the time that said at least one other fragment is received.

4. The method of claim 1, further comprising:

in response to a determination that said transmission queue has exceeded said threshold, foregoing adding said fragment to said transmission queue; and ensuring that all other fragments of said set of information are not added to said transmission queue when they are received.

5. The method of claim 4, wherein ensuring that all other fragments are not added to said transmission queue comprises:

creating a record associated with said set of information; and storing in said record an indication that all fragments of said set of information are not to be added to said transmission queue.

6. The method of claim 5, wherein ensuring that all other fragments are not added to said transmission queue further comprises:

receiving, at least one of said other fragments;

determining whether said record contains an indication that all fragments of said set of information are not to be added to said transmission queue; and in response to a determination that said record contains an indication that all fragments of said set of information are not to be added to said transmission queue, foregoing adding said at least one other fragment to said transmission queue.

7. An apparatus for dispatching information sets, comprising:

a mechanism for receiving a fragment of a set of information, said set of information comprising a plurality of fragments;

a mechanism for determining whether a transmission queue has exceeded a predetermined threshold;

a mechanism for adding, in response to a determination that said transmission queue has not exceeded said threshold, said fragment to said transmission queue; and a mechanism for ensuring that all other fragments of said set of information are added to said transmission queue when they are received regardless of the size of said transmission queue at the time that said other fragments are received, thereby guaranteeing that all fragments of said set of information are added to said transmission queue.

8. The apparatus of claim 7, wherein the mechanism for ensuring comprises:

a mechanism for creating a record associated with said set of information; and a mechanism for storing in said record an indication that all fragments of said set of information are to be added to said transmission queue.

9. The apparatus of claim 8, wherein the mechanism for ensuring further comprises:

a mechanism for receiving at least one of said other fragments;

a mechanism for determining whether said record contains an indication that all fragments of said set of information are to be added to said transmission queue; and a mechanism for adding, in response to a determination that said record contains an indication that all fragments of said set of information are to be added to said transmission queue, said at least one other fragment to said transmission queue regardless of the size of said transmission queue at the time that said at least one other fragment is received.

10. The apparatus of claim 7, further comprising:

a mechanism for foregoing adding, in response to a determination that said transmission queue has exceeded said threshold, said fragment to said transmission queue; and a mechanism for ensuring that all other fragments of said set of information are not added to said transmission queue when they are received.

11. The apparatus of claim 10, wherein the mechanism for ensuring that all other fragments are not added to said transmission queue comprises:

a mechanism for creating a record associated with said set of information; and a mechanism for storing in said record an indication that all fragments of said set of information are not to be added to said transmission queue.

12. The apparatus of claim 11, wherein the mechanism for ensuring that all other fragments are not added to said transmission queue further comprises:

a mechanism for receiving at least one of said other fragments;

a mechanism for determining whether said record contains an indication that all fragments of said set of information are not to be added to said transmission queue; and a mechanism for foregoing adding, in response to a determination that said record contains an indication that all fragments of said set of information are not to be added to said transmission queue, said at least one other fragment to said transmission queue.

13. A computer program product for dispatching information sets, comprising:

instructions for causing one or more processors to receive a fragment of a set of information, said set of information comprising a plurality of fragments;

instructions for causing one or more processors to determine whether a transmission queue has exceeded a predetermined threshold;

instructions for causing one or more processors to add, in response to a determination that said transmission queue has not exceeded said threshold, said fragment to said transmission queue; and instructions for causing one or more processors to ensure that all other fragments of said set of information are added to said transmission queue when they are received regardless of the size of said transmission queue at the time that said other fragments are received, thereby guaranteeing that all fragments of said set of information are added to said transmission queue.

14. The computer program product of claim 13, wherein the instructions for causing one or more processors to ensure comprises:

instructions for causing one or more processors to create a record associated with said set of information; and instructions for causing one or more processors to store in said record an indication that all fragments of said set of information are to be added to said transmission queue.

15. The computer program product of claim 14, wherein the instructions for causing one or more processors to ensure further comprises:

instructions for causing one or more processors to receive at least one of said other fragments;

instructions for causing one or more processors to determine whether said record contains an indication that all fragments of said set of information are to be added to said transmission queue; and instructions for causing one or more processors to add, in response to a determination that said record contains an indication that all fragments of said set of information are to be added to said transmission queue, said at least one other fragment to said transmission queue regardless of the size of said transmission queue at the time that said at least one other fragment is received.

16. The computer program product of claim 13, further comprising:

instructions for causing one or more processors to forego adding, in response to a determination that said transmission queue has exceeded said threshold, said fragment to said transmission queue; and instructions for causing one or more processors to ensure that all other fragments of said set of information are not added to said transmission queue when they are received.

17. The computer program product of claim 16, wherein the instructions for causing one or more processors to ensure that all other fragments are not added to said transmission queue comprises:

instructions for causing one or more processors to create a record associated with said set of information; and instructions for causing one or more processors to store in said record an indication that all fragments of said set of information are not to be added to said transmission queue.

18. The computer program product of claim 17, wherein the instructions for causing one or more processors to ensure that all other fragments are not added to said transmission queue further comprises:

instructions for causing one or more processors to receive at least one of said other fragments;

instructions for causing one or more processors to determine whether said record contains an indication that all fragments of said set of information are not to be added to said transmission queue; and instructions for causing one or more processors to forego adding, in response to a determination that said record contains an indication that all fragments of said set of information are not to be added to said transmission queue, said at least one other fragment to said transmission queue.

* * * * *